UNITED STATES PATENT OFFICE.

CARLETON ELLIS, OF MONTCLAIR, NEW JERSEY.

WATER-REPELLENT CEMENT AND PROCESS OF MAKING SAME.

1,109,120.      Specification of Letters Patent.      Patented Sept. 1, 1914.

No Drawing.      Application filed February 20, 1912. Serial No. 678,882.

*To all whom it may concern:*

Be it known that I, CARLETON ELLIS, a citizen of the United States, and a resident of Montclair, in the county of Essex and State of New Jersey, have invented certain new and useful Improvements in Water-Repellent Cement and Processes of Making Same, of which the following is a specification.

This invention relates to a process of waterproofing concrete by means of miscible oils and the like and to the product of such process and relates in particular to a process involving the use of miscible oil of the type described in Letters Patent No. 993,827 and 865,578, all as more fully hereinafter described and as claimed.

In the waterproofing of concrete by means of petroleum oil and the like as described by Page (U. S. Patent 1,000,545) and others, it is not always a simple matter to incorporate the water, oil and aggregate to form an uniformly mixed batch of material. Under skilled supervision uniformity in mixing doubtless is possible but with ordinary labor great difficulties often arise.

The present invention has for its object the process of making a waterproofed concrete and the product of such process, which does not call for skilled labor in the mixing of the raw materials, but which may be carried out by unskilled labor in accordance with the relatively simple procedure hereinafter set forth.

In Patent No. 993,827 I have described a miscible oil containing an oil-soluble copper salt or other metallo-organic compound of a similar character, which oil when containing copper and the like may be used as a spraying composition.

The present invention involves in one form, the treatment or preparation of concrete with an oil of this description, or miscible oils of the sulfite liquor type as will be hereinafter indicated. In using a copperized or metallized oil of the type above mentioned I may mix, say, one gallon of the miscible oil with the water used in tempering a barrel of Portland cement, with its usual concomitant of sand, gravel and the like and thus form an intimate mixture of oil and water with more or less water-insoluble soap, which reacts with the cement components in an especially effective way. The reaction which takes place on the admixture of this oil to the cement composition is peculiar. The soap or similar material which renders the oil miscible with water reacts with the lime forming a calcium soap, thereby destroying the emulsifying properties of the mixture and liberating the oil, as it were, in a very finely divided form which enables the oil to be readily incorporated throughout the mass. At the same time, the metallic soap which is present may be in part thrown out of the oil which further enhances the waterproofing qualities of the composition.

A miscible oil which does not carry the metallo-organic compound insoluble in water is made from 10 parts of petroleum oil of about 30 degrees Baumé to 1 part of resinate of potash, 1 part of oleate of potash, 2 parts of heavy pine oil and 2 parts of coal tar. In place of coal tar, asphaltic oil or other bituminous products may be used.

In Patent No. 865,578, of Sept. 10, 1907, I have described the emulsification of oils for the formation of solutions of oils with waste sulfite liquor of the paper industry and such compositions may be used for the present purpose, namely that of enabling the production of an oil emulsion suitable for mixing with the cement and aggregate. The waste sulfite liquor contains calcium lignosulfonate which is not precipitated by lime, so that the addition of this material to cement does not cause the reaction referred to above. The oil is however, liberated from solution by such dilution and is thus obtained in a finely divided condition well suited for waterproofing purposes. The sulfite liquor may be used as a binder and when the composition is used for waterproofing a cement road bed, for example, the oil waterproofs the cement, while the sulfite liquor serves as a binder. In using a composition of this character it should of course be diluted with water before mixing with the materials employed for the cement mixture. For example, one part of sulfite liquor of a gravity of 30 degrees Baumé is mixed with 1½ parts of asphalt oil. On beating these materials together for a time they apparently mix and this material may be reduced with water, when the oil is precipitated in a finely divided state, giving a good emulsion. Sufficient water is added to the emulsion to serve for gaging purposes and the cement construction prepared in this manner.

A miscible oil suitable for the purpose of the present invention may be, therefore, an oil containing a water soluble soap precipitable by lime or one containing a soap unprecipitable by lime and in the former case it is desirable to have, in addition, a mineral oil which forms a cheap and inert basis and an ingredient which lends to miscibility apart from a water soluble soap. Such bodies are the creosotes and the terpenes in particular although other compounds may be used. A mineral oil combined with a water soluble soap is more satisfactory for the purpose of making waterproof concrete in many instances, if it carries such a homogenizing element and this in particular is the case when waterproofing actual cement masses.

The petroleum oil which as stated, is the preferred oily basis for a miscible oil of the character employed in the present process, may be a light oil such as spindle oil or a heavy oil such as 25% paraffin oil, or cylinder oil, red engine oil, petroleum jelly, residuum, crude wax and the like. The consistency of the composition should be preferably a fluid or soft paste so that the labor involved in reducing with water is slight, but it is also possible to prepare a composition in the form of a solid.

I have set forth briefly certain illustrative compositions, but I do not wish to be limited to the exact procedure described in using these compositions, but may invoke the doctrine of equivalency in so far as same may be herein applicable.

To recapitulate, my invention involves the admixtures of cement and filling material with water and a miscible oil to produce a concrete mass more or less waterproof by the action of the miscible oil and my invention relates in particular to the use of a miscible oil containing a water soluble soap preferably in conjunction with a homogenizing element. Further it should be stated that this application contains matter disclosed in Serial No. 642,188, for road bed and process of making same, wherein the method of treating concrete masses with oil rendered miscible with a body such as sulfite liquor, is set forth, and the manner of its use for making road beds of concrete is especially described. This application does not relate to the waterproofing of plaster or of plaster containing some cement, which matter is described and claimed in my co-pending case, Serial No. 652,114 of Sept. 30, 1911 and Serial No. 679,447.

What I claim is,

1. The process of making a waterproofed concrete which comprises incorporating with concrete a modicum of a miscible oil, carrying mineral oil, an emulsifying agent, water soluble soap and water insoluble soap.

2. The process of making a waterproof concrete which comprises incorporating with cementitious material an oil-containing composition carrying mineral oil, a water soluble soap in solution in said composition and a water insoluble soap incorporated therewith.

Signed at Montclair in the county of Essex and State of New Jersey this 17th day of February A. D. 1912.

CARLETON ELLIS.

Witnesses:
ADOLPHUS H. NEY,
NATHANIEL L. FOSTER.